May 31, 1960 A. V. L. C. DEBRIE 2,938,447
ARRANGEMENT FOR PRINTING COLOR FILMS
Filed Nov. 5, 1956
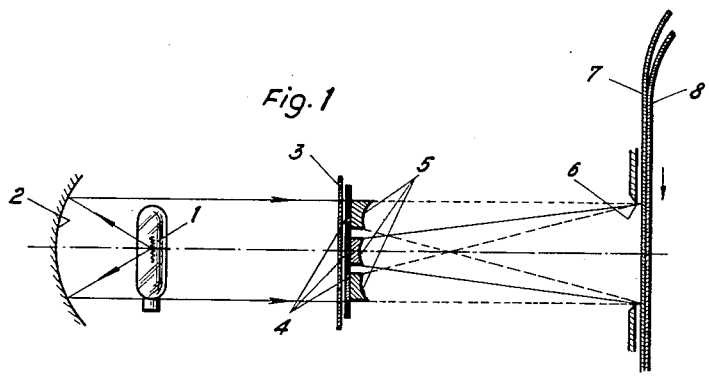
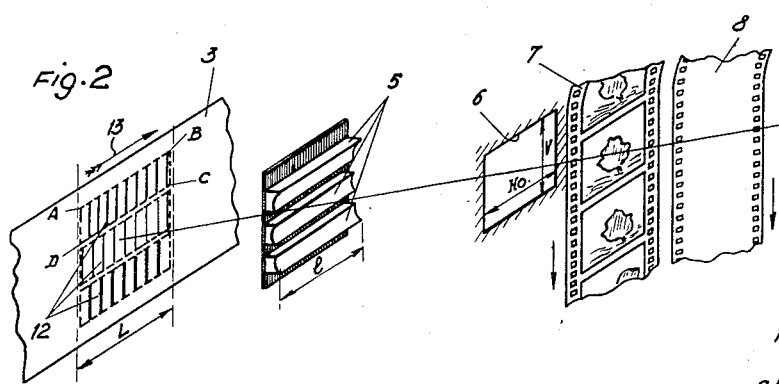
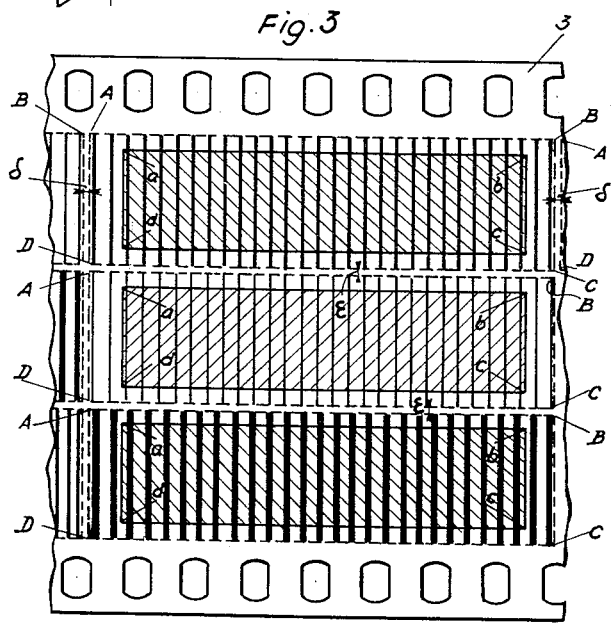
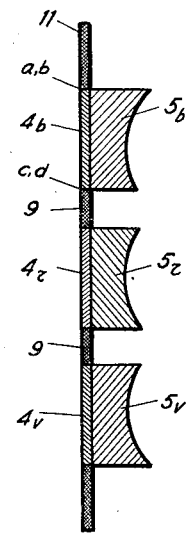
INVENTOR:
André Victor Léon Clément Debrie
BY: Michael S. Striker

United States Patent Office 2,938,447
Patented May 31, 1960

2,938,447

ARRANGEMENT FOR PRINTING COLOR FILMS

André Victor Léon Clément Debrie, 111, Rue Saint-Maur, Seine, Paris, France

Filed Nov. 5, 1956, Ser. No. 620,370

Claims priority, application France Nov. 10, 1954

7 Claims. (Cl. 95—75)

I have already proposed, when printing different scenes in intermittently operating color film printing machines, to adjust the printing light illuminating the gate in register with which the film to be printed is located, by resorting to three colored luminous beams, each beam being of an elementary color as obtained, by the passage, through a color filter, of a selected white light produced by a single source of light, the intensity of each elementary flux of light being adjusted through the interposition in the path of the white light during the printing of each scene of a system of three diaphragm filters associated each with one of the colored beams.

These filters were arranged as three rectangular filter areas the longer sides of which were perpendicular to the length of a filter strip carrying them, said longer sides being also parallel with the horizontal axes of three cylindrical concave lenses, associated each with a colored filter so as to superpose the three elementary beams of light on the printing gate and to restore a compound light depending upon the associated diaphragm filter selected in accordance with previously defined data.

Each of the diaphragm filters was constituted by a grating or network of opaque lines the breadth and spacing of which vary in the different rectangular filter areas so as to produce through a suitable proportioning of the breadth of the black opaque surfaces and of the intermediate transparent surfaces a degree of opacity of a predetermined percentage causing the production of a predetermined neutral grey color. These gratings or networks were arranged with their horizontal lines perpendicular to the edges of the filter strip and in parallelism with the generating lines of the concave cylindrical lenses as disclosed in my prior French Patent 1,053,020.

In the preceding disclosure and hereinafter, I consider as horizontal a direction parallel with the generating lines of the cylindrical lenses which are assumed to be horizontal. This direction is only a reference direction and it is called horizontal only for the sake of convenience. Without widening the scope of the invention as defined in the accompanying claims, said generating lines may be directed otherwise with reference to true horizontal and vertical lines.

The film to be printed moved in said prior arrangement in front of the picture gate in the direction of the height of the pictures carried by it, which height is smaller than the breadth in the case of standard films. Furthermore, the spreading of the beams was executed in said prior arrangement in a horizontal direction, i.e. in parallelism with the longer sides of the pictures and it was consequently quite considerable. This spreading of the beams was symmetrical only for the central beam but, toward each small side of the picture the outer beams assumed an obliquity which was almost zero near one small die, while near the far side it assumed a maximum obliquity;

The proportions between the three elementary colors were thus altered and vertical areas shaded off differently in parallelism with the height of the pictures appeared on the latter.

This resulted in an objectionable effect e.g. in the sky portions of the pictures together with modifications in color affecting both the persons and the grounds in the pictures. Furthermore, by reason of the adjacent edges of the colored filters and of the ruled neutral filter rectangles being not spaced from each other, considerable difficulties were experienced in trying to align with the desired accuracy the separating boundaries or edges of the gratings or networks in exact register with the boundaries between the individual colored beams. The least overlapping due to an imperfect progression of the filter strip made the above mentioned shading off effects still worse.

Now, my present invention has for its object means for removing said drawbacks by making their effects practically imperceptible.

My present invention has more specifically for its objects an arrangement for illuminating with a corrected light, the printing gate of a printing machine, said gate having its breadth larger than its height and extending in parallelism with the generating lines of a system of three parallel cylindrical lenses mounted near one another with opaque intervals separating said lenses. Each of said lenses having horizontal generating lines is provided with a plane surface parallel with and facing away from the picture gate and a concave surface facing the gate and directed in a manner such as to produce a divergence of the light flux passing out of it after it has been colored through its passage through a filter of an elementary color, said divergence spreading the beam over the entire surface of that gate. Each lens receives a bundle of rays which have been made parallel after their production by a single common source of white light and the intensity of the rays impinging on each lens is adjusted through the passage of said rays through at least one neutral filter strip arranged in front of the lens and carrying a combination of suitably defined filters for adjusting each flux of an elementary color, the superposition of said fluxes in the printing gate forming the printing light suiting each predetermined scene. This arrangement is characterized by the fact that the shifting of the neutral filter strip is performed horizontally in parallelism with the generating lines of the lenses and with the longer sides of the picture gate, behind which the pictures are printed in succession, while the filter arrangement carried by the neutral filter strip for adjusting the different luminous fluxes of predetermined elementary colors is constituted by gratings or networks occupying each a rectangular filter area which when in a selected position projects beyond the different edges of the rectangular input surface of the corresponding lens, each grating being constituted by a succession of transparent sections separated by parallel opaque lines arranged vertically perpendicularly to the direction of shifting of the neutral filter strip.

I have illustrated in accompanying drawings a preferred embodiment of my invention given by way of a mere exemplification. In said drawings:

Fig. 1 is an elevational sectional view of the arrangement showing its different parts;

Fig. 2 is a diagrammatic exploded perspective view of said different parts;

Fig. 3 is on an enlarged scale an elevational view of a fraction of the masking or filter strip according to my invention, said strip including three neutral elementary filters or networks lying in vertical register across the strip when positioned for printing a scene in front of the corresponding color filters.

Fig. 4 is a diagrammatic elevational sectional view of a combination or assembly of color filters and cylindrical lenses on a scale corresponding to that of Fig. 3.

In said figures, 1 designates a common calibrated source of white light concentrated by a concave mirror 2 through the neutral filter strip 3, onto the filter-lens combination of color filters 4 and of associated negative cylindrical lenses 5. The filter strip may be shifted horizontally in direction of arrow 13 and the cylindrical lenses have horizontal generating lines parallel with the lines of progression of said filter strip as it passes in front of the filters positioned for printing purposes.

The cylindrical lenses spread in a vertical direction and superpose on the printing gate 6 the three colored beams; behind said gate, the film 7 to be printed and the film 8 which is to receive the printed pictures are superposed and move jointly for contact printing purposes for instance.

The films 7 and 8 move in the example illustrated in a vertical direction behind the gate 6 and the pictures thereon have their longer horizontal sides parallel with the generating lines of the cylindrical lenses.

Figs. 3 and 4 show clearly the important advantages of the novel arrangement of the various parts with reference to one another. The color filters 4b, 4r, 4v are mounted as light transmitting elements in rectangular openings $a\ b\ c\ d$ providid in a flat filter holder 11 and extending horizontally. These openings which are similar to one another have at either end their smaller sides in alignment with each other while the longer sides $ab$, $cd$ of the center opening are spaced from those of the outer openings and separated by opaque webs 9 left uncut in the opaque filter holder 11 in which are cut the openings $a\ b\ c\ d$.

The transparent neutral filter strip 3 is in the present case constituted by a unitary member provided with perforations through which it is driven.

Said neutral filter strip moves between the different scense horizontally by an amount equal to $$AB + \delta = L \geq ab \leq l$$

$l$ being the length of the cylindrical lenses 5, $ab$ being the length of the opening surrounding the color filter 4, AB being the length of the rectangular filter areas A B C D in each of which is formed a grating of opaque lines 12 perpendicular to the direction of displacement 13 of the neutral filter strip 3, said grating forming for the corresponding scene of diaphragm filter of a predetermined opacity as required for a corresponding elementary color.

$\delta$ being the breadth of the horizontal spacing provided on the neutral filter strip between consecutive screen sections each comprising three vertically aligned filter areas 12 corresponding to the printing requirements of two successive scenes.

Vertically, the filter areas 12 formed by the ruled rectangles A B C D have their sides AD, BC longer than the corresponding sides $ad$, $bc$ of the openings holding the color filters 4.

The ruled rectangles 12 being vertically separated by spacings $\epsilon$, said rectangles project on all sides beyond the edges of the corresponding openings $a\ b\ c\ d$, so that the marginal portions of filter areas overlap the opaque webs 9 or other portions of the opaque filter holder 11 in such a manner that the filtering effect of each filter area 12 on the light passing through the corresponding filter 4 is wholly independent in practice of the unavoidable allowances in the transverse guiding and in the horizontal progression of the neutral filter strip 3, which was not the case in those prior arrangements wherein the ruled rectangular filters were positioned adjacently without spacing, the grating lines being parallel with their longer sides extending in parallelism with the direction of progression of the filter strip.

In the arrangements according to my present invention the allowances as to the positioning, on the neutral filter strip, of the filter areas 12 or ruled rectangles A B C D and to the positioning of the neutral filter strip 3 may be quite considerable without this affecting by any means the proper operation of the apparatus and the adjustment of the luminous flux. Furthermore, the fact of locating the film to be printed behind the printing gate with the longer sides of the latter extending horizontally has for its result that the spreading of the luminous beams in the direction of the height of the picture V, which is smaller than the horizontal breadth of the picture $H_o$ produces a lesser obliquity of the impinging light.

This reduced obliquity, if any, will lead to the production of a more uniform shading off in parallelism with horizontal edge of a picture both for the upper portions e.g. the skies and for the lower portions e.g. the grounds in the foreground and said shading off will generally not even be perceptible or it will appear as natural whereas it was highly objectionable when it affected the entire height of the picture on the right hand and on the left hand side as was the case in prior arrangements.

In the example illustrated, the gratings in the filter areas 12 are produced through printing on a common strip 3 constituted for instance by a transparent strip provided with perforations for controlling its progression. In each screen section of a predetermined pitch length L, the three gratings 12 of densities predetermined for a corresponding scene are carried in vertical alignment.

Said gratings may be printed photographically for instance, starting from negatives obtained photographically or through any other suitable method; said negatives being arranged in correct registering relationship are printed in juxtaposition or else the gratings may be printed mechanically in black on a transparent carrier through the agency of suitably registering engraved cuts or in any other suitable manner.

By reason of the presence of the opaque webs 9 between the colored beams, it is also possible to provide an arrangement with three separate filter strips each carrying only one type of grating and moving in parallelism, the shifting of each strip positioning the suitable filter grating required for each elementary light in each scene.

Under such conditions, it is even possible to use three identical strips carrying each the complete range of well defined gratings, say forty ruled gratings for forty different predetermined filtering values, while means of any known type provide for the positioning of each filtering grating through a predetermined movement so as to form the predetermined filter-picture relation suiting the printing of any desired scene; said relation is not established before the start of the operation but is obtained automatically through the introduction between two successive scenes of the operation of means controlling the desired relation, which control operation should be prepared beforehand for the successive scenes, for instance by means of a perforated strip the perforations of which correspond to a code and act on contact-pieces providing for the positioning of the gratings of the proper filter picture relation available in the different filter strips.

What I claim is:

1. In an arrangement for printing successive scenes of a color film, having a source of white light and a gate along which a film strip to be copied and a film strip to be printed are moved in superimposed position, in combination, a plurality of stationary filter-lens combinations, each of said combinations comprising a color filter positioned across a portion of the beam of light from said source to said gate so that said plurality of filter-lens combinations causes a plurality of differently colored beams of light directed substantially toward said gate, and an associated negative cylindrical lens located between the associated one of said color filters, respectively, and said gate, the axes of said lenses extending substantially parallel with each other and with the plane in which said film strips extend while passing along said gate, said individual lenses being so spaced from each other and so oriented optically as to be capable of spreading the color-filtered light respectively received from said individual filters over the entire surface of said gate in superimposed relation; and a neutral filter strip capable of being moved longitudinally in a direction substantially parallel with said axes of said lenses between a plurality of selectable positions across said beam of light between said source and said color filters, said neutral filter strip being provided with a longitudinally extending series of consecutive screen sections, each of said screen sections comprising a plurality of neutral filter areas corresponding in number to the number of said color filters and being so arranged within a particular screen section that each of said neutral filter areas registers with one of said color filters, respectively, when that particular screen section is positioned in any of said selectable positions of said filter strip in register with said plurality of color filters, said neutral filter areas in said individual screen sections having each a predetermined degree of opacity, so that during the printing of successive scenes said filter strip may be moved for each scene into a corresponding selected position in which said neutral filter areas of the particular screen section cause the intensity of colored light passing through said individual dual color filters to be adjusted to the requirements of the particular scene.

2. In an arrangement for printing successive scenes of a color film, having a source of white light and a gate along which a film strip to be copied and a film strip to be printed are moved in their longitudinal direction in superimposed position, in combination, a plurality of stationary filter-lens combinations, each of said combinations comprising a color filter positioned across a portion of the beam of light from said source to said gate so that said plurality of filter-lens combinations causes a plurality of differently colored beams of light directed substantially toward said gate, and an associated negative cylindrical lens located between the associated one of said color filters, respectively, and said gate, the axes of said lenses extending substantially parallel with each other and with the plane in which said film strips extend while passing along said gate, and parallel with the longer edges of the individual frames appearing on said film strips of said gate, said individual lenses being so spaced from each other and so oriented optically as to be capable of spreading the color-filtered light respectively received from said individual filters over the entire surface of said gate in superimposed relation; and a neutral filter strip capable of being moved longitudinally in a direction substantially parallel with said axes of said lenses between a plurality of selectable positions across said beam of light between said source and said color filters, said neutral filter strip being provided with a longitudinally extending series of consecutive screen sections, each of said screen sections comprising a plurality of neutral filter areas corresponding in number to the number of said color filters and being so arranged within a particular screen section that each of said neutral filter areas registers with one of said color filters, respectively, when that particular screen section is positioned in any of said selectable positions of said filter strip in register with said pluralty of color filters, said neutral filter areas in said individual screen sections having each a predetermined degree of opacity, so that during the printing of successive scenes said filter strip may be moved for each scene into a corresponding selected position in which said neutral filter areas of the particular screen section cause the intensity of colored light passing through said individual color filters to be adjusted to the requirements of the particular scene.

3. In an arrangement for printing successive scenes of a color film, having a source of white light and a gate along which a film strip to be copied and a film strip to be printed are moved in their longitudinal direction in superimposed position, in combination a filter-lens assembly comprising, a plurality of stationary filter-lens combinations, each of said combinations comprising a color filter positioned across a portion of the beam of light from said source to said gate so that said plurality of filter-lens combinations causes a plurality of differently colored beams of light directed substantially toward said gate, and an associated negative cylindrical lens located between the associated one of said color filters, respectively, and said gate, the axes of said lenses extending substantially parallel with each other and with the plane in which said film strips extend while passing along said gate, and parallel with the longer edges of the individual frames appearing on said film strips at said gate, said individual lenses being so spaced from each other and so oriented optically as to be capable of spreading the color-filtered light respectively received from said individual filters over the entire surface of said gate in superimposed relation, and a filter holder made of substantially flat opaque material mounted between said source of light and said gate and extending transversely of the direction of said beam of light, said holder being provided with openings spaced from each other in a direction substantially transverse of said longitudinal direction of said film strips, one of said color filters being mounted in each of said openings; and a neutral filter strip capable of being moved longitudinally in a direction substantially parallel with said axes of said lenses between a plurality of selectable positions across said beam of light between said source and said color filters, said neutral filter strip being provided with a longitudinally extending series of consecutive screen sections, each of said screen sections comprising a plurality of neutral filter areas corresponding in number to the number of said color filters and being so arranged within a particular screen section that each of said neutral filter areas registers with one of said color filters, respectively, when that particular screen section is positioned in any of said selectable positions of said filter strip in register with said plurality of color filters, said neutral filter areas in said individual screen sections having each a predetermined degree of opacity, so that during the printing of successive scenes said filter strip may be moved for each scene into a corresponding selected position in which said neutral filter areas of the particular screen section cause the intensity of colored light passing through said individual color filters to be adjusted to the requirements of the particular scene.

4. In an arrangement for printing successive scenes of a color film, having a source of white light and a gate along which a film strip to be copied and a film strip to be printed are moved in their longitudinal direction in superimposed position, in combination a filter-lens assembly comprising a plurality of stationary filter-lens combinations, each of said combinations comprising a color filter positioned across a portion of the beam of light from said source to said gate so that said plurality of filter-lens combinations causes a plurality of differently colored beams of light directed substantially toward said gate, the axes of said lens extending substantially parallel with each other and with the plane in which said film strips extend while passing along said gate, and parallel with the longer edges of the individual frames appearing on said film strips at said gate, said individual lenses being so spaced from each other and so oriented optically as to be capable of spreading the color-filtered light respectively received from said individual filters over the entire surface of said gate in superimposed relation, and a filter holder made of substantially flat opaque material mounted between said source of light and said gate and extending transversely of the direction of said beam of light, said holder being provided with openings spaced from each other in a direction substantially transverse of said longitudinal direction of said film strips, one of said color filters being mounted in each of said openings in register with the assocated color filter between the latter and said gate and a neutral filter strip capable of being moved longitudinally in a direction substantially parallel with said axes of said lenses between a plurality of selectable positions across said beam of light between said source and said color filters, said neutral filter strip being provided with a longitudinally extending series of consecutive screen sections, each of said screen sections comprising a plurality of neutral filter areas corresponding in number to the number of said color filters and being so arranged within a particular screen section that each of said neutral filter areas registers with one of said color filters, respectively, when that particular screen section is positioned in any of said selectable positions of said filter strip in register with said plurality of color filters, said neutral filter areas in said individual screen sections having each a predetermined degree of opacity, so that during the printing of successive scenes said filter strip may be moved for each scene into a corresponding selected position in which said neutral filter areas of the particular screen section cause the intensity of colored light passing through said individual color filters to be adjusted to the requirements of the particular scene.

5. In an arrangement for printing successive scenes of a color film, having a source of white light and a gate along which a film strip to be copied and a film strip to be printed are moved in their longitudinal direction in superimposed position, in combination, a filter-lens assembly comprising a plurality of stationary filter-lens combinations, each of said combinations comprising a color filter positioned across a portion of the beam of light from said source to said gate so that said plurality of filter-lens combinations causes a plurality of differently colored beams of light directed substantially toward said gate, and an associated negative cylindrical lens the axes of said lenses extending substantially parallel with each other and with the plane in which said film strips extend while passing along said gate and parallel with the longer edges of the individual frames appearing on said film strips at said gate, said individual lenses being so spaced from each other and so oriented optically as to be capable of spreading the color-filtered light respectively received from said individual filters over the entire surface of said gate in superimposed relation, and a filter holder made of substantially flat opaque material mounted between said source of light and said gate and extending transversely of the direction of said beam of light, said holder being provided with openings spaced from each other in a direction substantially transverse of said longitudinal direction of said film strips, one of said color filters being mounted in each of said openings in register with the associated color filter between the latter and said gate; and a neutral filter strip capable of being moved longitudinally in a direction substantially parallel with said axes of said lenses between a plurality of selectable positions across said beam of light between said source and said color filters, said neutral filter strips being provided with a longitudinally extending series of consecutive screen sections, each of said screen sections comprising a plurality of neutral filter areas corresponding in number to the number of said color filters and being so arranged within a particular screen section that each of said neutral filter areas registers with one of said color filters, respectively, when that particular screen section is positioned in any of said selectable positions of said filter strip in register with said plurality of color filters, said neutral filter areas in said individual screen sections having each a predetermined degree of opacity, and being so dimensioned that when a screen section is positioned in one of said selectable positions, the marginal portions of said filter areas overlap those portions of said opaque filter holder which surround said color filters held in said holder, so that during the printing of successive scenes said filter strip may be moved for each scene into a corresponding selected position in which said neutral filter areas of the particular screen section cause the intensity of colored light passing through said individual color filters to be adjusted to the requirements of the particular scene.

6. In an arrangement for printing successive scenes of a color film, having a source of white light and a gate along which a film strip to be copied and a film strip to be printed are moved in their longitudinal direction in superimposed position, in combination, a filter-lens assembly comprising a plurality of stationary filter-lens combinations, each of said combinations comprising a color filter positioned across a portion of the beam of light from said source to said gate so that said plurality of filter-lens combinations causes a plurality of differently colored beams of light directed substantially toward said gate, and capable of accommodating said color filters; a plurality and an associated negative cylindrical lens the axes of said lenses extending substantially parallel with each other and with the plane in which said film strips extend while passing along said gate and parallel with the longer edges of the individual frames appearing on said film strips at said gate, said individual lenses being so spaced from each other and so oriented optically as to be capable of spreading the color-filtered light respectively received from said individual filters over the entire surface of said gate in superimposed relation, and a filter holder made of substantially flat opaque material mounted between said source of light and said gate and extending transversely of the direction of said beam of light, said holder being provided with openings spaced from each other in a direction substantially transverse of said longitudinal direction of said film strips, one of said color filters being mounted in each of said openings in register with the associated color filter between the latter and said gate; and a neutral filter strip capable of being moved longitudinally in a direction substantially parallel with said axes of said lenses between a plurality of selectable positions across said beam of light between said source and said color filters, said neutral filter strip being provided with a longitudinally extending series of consecutive screen sections, each of said screen sections comprising a plurality of neutral filter areas corresponding in number to the number of said color filters and being so arranged within a particular screen section that each of said neutral filter areas registers with one of said color filters, respectively, when that particular screen section is positioned in any of said selectable positions of said filter strip in register with said plurality of color filters, said neutral filter areas in said individual screen sections having each a pattern of parallel opaque lines extending in a direction transversely of said filter strip, the predetermined spacing and width of said lines defining a predetermined degree of opacity and being so dimensioned that when a screen section is positioned in one of said selectable positions, the marginal portions of said filter areas overlap those portions of said opaque filter holder which surround said color filters held in said holder, so that during the printing of successive scenes said filter strip may be moved for each scene into a corresponding selected position in which said neutral filter areas of the particular screen section cause the intensity of colored light passing through said individual color filters to be adjusted to the requirements of the particular scene.

7. In an arrangement for printing successive scenes of a color film, having a source of white light and a gate along which a film strip to be copied and a film strip to be printed are moved in their longitudinal direction in superimposed position, in combination, a filter-lens assembly comprising a plurality of stationary filter-lens combinations, each of said combinations comprising a color filter being positioned across a portion of the beam of light from said source to said gate so that said plurality of filter-lens combinations causes a plurality of differently colored beams of light directed substantially toward said gate, and an associated negative cylindrical lens the axes of said lenses extending substantially parallel with each other and with the plane in which said film strips extend while passing along said gate, and parallel with the longer edges of the individual frames appearing on said film strips at said gate, said individaul lenses being so spaced from each other and so oriented optically as to be capable of spreading the color-filtered light respectively received from said individual filters over the entire surface of said gate in superimposed relation, and a filter holder made of substantially flat opaque material mounted between said source of light and said gate and extending transversely of the direction of said beam of light, said holder being provided with openings spaced from each other in a direction substantially transverse of said longitudinal direction of said film strips, one of said color filters being mounted in each of said openings in register with the associated color filter between the latter and said gate; and a neutral filter strip capable of being moved longitudinally in a direction substantially parallel with said axes of said lenses between a plurality of selectable positions across said beam of light between said source and said color filters, said neutral filter strip being provided with a longitudinally extending series of consecutive screen sections, each of said screen sections comprising a plurality of neutral filter areas corresponding in number to the number of said color filters and being so arranged within a particular screen section that each of said neutral filter areas registers with one of said color filters, respectively, when that particular screen section is positioned in any of said selectable positions of said filter strip in register with said plurality of color filters, said neutral filter areas in said individual screen sections having each a pattern of parallel opaque lines extending in a direction transversely of said filter strip, the predetermined spacing and width of said lines defining a predetermined degree of opacity, and being so dimensioned that when a screen section is positioned in one of said selectable positions, the marginal portions of said filter areas overlap those portions of said opaque filter holder which surround said color filters held in said holder, the degree of opacity varying between the neutral filter areas within each screen section and between consecutive screen sections being predetermined in accordance with the requirements of different scenes of the color film to be printed so that during the printing of successive scenes said filter strip may be moved for each scene into a corresponding selected position in which said neutral filter areas of the particular screen section cause the intensity of colored light passing through said individual color filters to be adjusted to the requirements of the particular scene.

References Cited in the file of this patent
UNITED STATES PATENTS

| | | |
|---|---|---|
| 947,490 | Gwozdz | Jan. 25, 1910 |
| 1,361,012 | Capstaff | Dec. 7, 1920 |
| 2,117,727 | Jones | May 17, 1938 |